United States Patent
Lin et al.

(10) Patent No.: US 10,816,736 B2
(45) Date of Patent: Oct. 27, 2020

(54) OPTICAL FIBER CONNECTOR

(71) Applicant: SHEN ZHEN WONDERWIN TECHNOLOGY CO., LTD., Shenzhen, Guangdong Province (CN)

(72) Inventors: Jim Lin, Kaohsiung (TW); Kexue Ning, Shenzhen (CN); Xiangxu Zeng, Shenzhen (CN)

(73) Assignee: SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/559,243

(22) Filed: Sep. 3, 2019

(65) Prior Publication Data

US 2020/0088955 A1 Mar. 19, 2020

(30) Foreign Application Priority Data

Sep. 18, 2018 (TW) ............... 107212701 A

(51) Int. Cl.
*G02B 6/38* (2006.01)

(52) U.S. Cl.
CPC ......... *G02B 6/3874* (2013.01); *G02B 6/3821* (2013.01); *G02B 6/3825* (2013.01); *G02B 6/3869* (2013.01); *G02B 6/3881* (2013.01); *G02B 6/3893* (2013.01)

(58) Field of Classification Search
CPC .. G02B 6/3821; G02B 6/3825; G02B 6/3869; G02B 6/3874; G02B 6/3881; G02B 6/3893
See application file for complete search history.

(56) References Cited

U.S. PATENT DOCUMENTS

| | | | | |
|---|---|---|---|---|
| 6,945,705 B2* | 9/2005 | Takeda | .................. | G02B 6/3849 385/139 |
| 9,581,767 B2* | 2/2017 | Leigh | .................... | G02B 6/3849 |
| 9,933,586 B1* | 4/2018 | Yang | .................... | G02B 6/3847 |
| 2006/0153503 A1* | 7/2006 | Suzuki | ................. | G02B 6/3893 385/53 |
| 2011/0268394 A1* | 11/2011 | Shen | ..................... | G02B 6/3849 385/78 |

FOREIGN PATENT DOCUMENTS

| WO | WO-2013042000 A1 * | 3/2013 | ........... G02B 6/3849 |
|---|---|---|---|
| WO | WO-2013042001 A1 * | 3/2013 | ........... G02B 6/3849 |

* cited by examiner

*Primary Examiner* — Daniel Petkovsek
(74) *Attorney, Agent, or Firm* — Muncy, Geissler, Olds & Lowe, P.C.

(57) ABSTRACT

An optical fiber connector includes a main unit and a housing unit. The main unit includes a boot and a connector module that has a rear part connected to a front end of the boot, and a front coupling end distal from the boot. The housing unit includes a sliding sleeve sleeved slidably around the connector module, and a light blocking member pivotally connected to the sliding sleeve. The sliding sleeve is operable between a light blocking position, where the light blocking member blocks light from the front coupling end, and a fiber coupling position, where the light blocking member rotates relative to the sliding sleeve and allows the front coupling end to be exposed from the sliding sleeve.

8 Claims, 6 Drawing Sheets

OPTICAL FIBER CONNECTOR

CROSS-REFERENCE TO RELATED APPLICATION

This application claims priority of Taiwanese Patent Application No. 107212701, filed on Sep. 18, 2018.

FIELD

The disclosure relates to a connector, and more particularly to an optical fiber connector.

BACKGROUND

FIG. 1 illustrate an SC-type optical fiber connector 1 that includes a housing 11, a ferrule assembly 12 sleeved into the housing 11, and a boot 13 connected to a rear part of the ferrule assembly 12. An optical fiber cable (not shown) is inserted through the boot 13 into a front part of the ferrule assembly 12, and carries invisible light for transmitting light signals to other optical fiber terminal device connected to the optical fiber connector 1. However, before the optical fiber connector 1 is connected to other optical fiber terminal device, the front part of the ferrule assembly 12 is in an exposed state and the invisible lights coming out therefrom are harmful to human eyes.

SUMMARY

Therefore, an object of the disclosure is to provide an optical fiber connector that can alleviate the aforesaid drawback of the prior art.

According to this disclosure, an optical fiber connector includes a main unit and a housing unit.

The main unit includes a boot and a connector module that has a rear part connected to a front end of the boot, and a front coupling end distal from the boot.

The housing unit includes a sliding sleeve sleeved slidably around the connector module, and a light blocking member pivotally connected to the sliding sleeve.

The sliding sleeve is operable to slide in a front-rear direction of the connector module and is movable between a light blocking position, where the light blocking member is in front of and blocks light from the front coupling end, and a fiber coupling position, where the light blocking member rotates in an opening direction relative to the sliding sleeve and allows the front coupling end to be exposed from the sliding sleeve.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
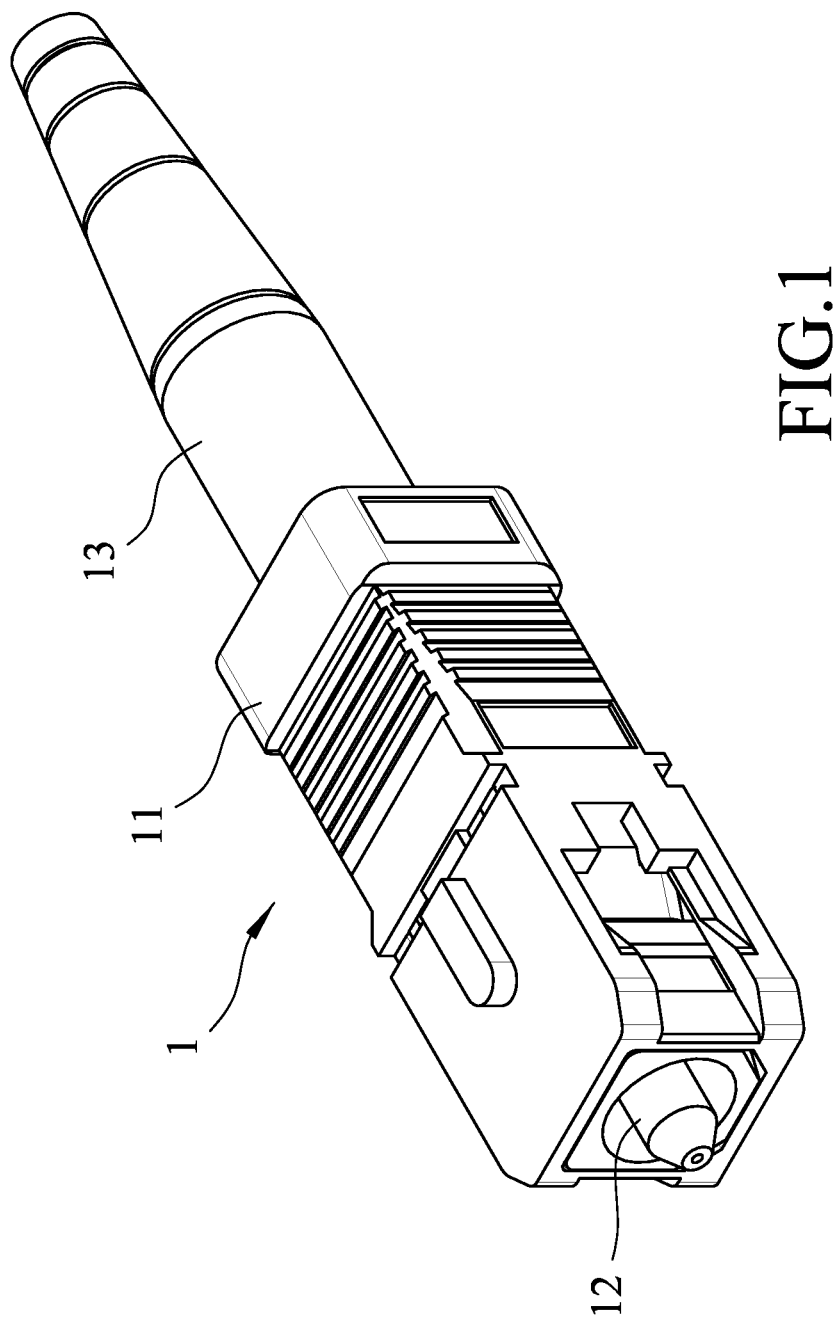
FIG. 1 is a perspective view of an existing optical fiber connector.
Figure 2:
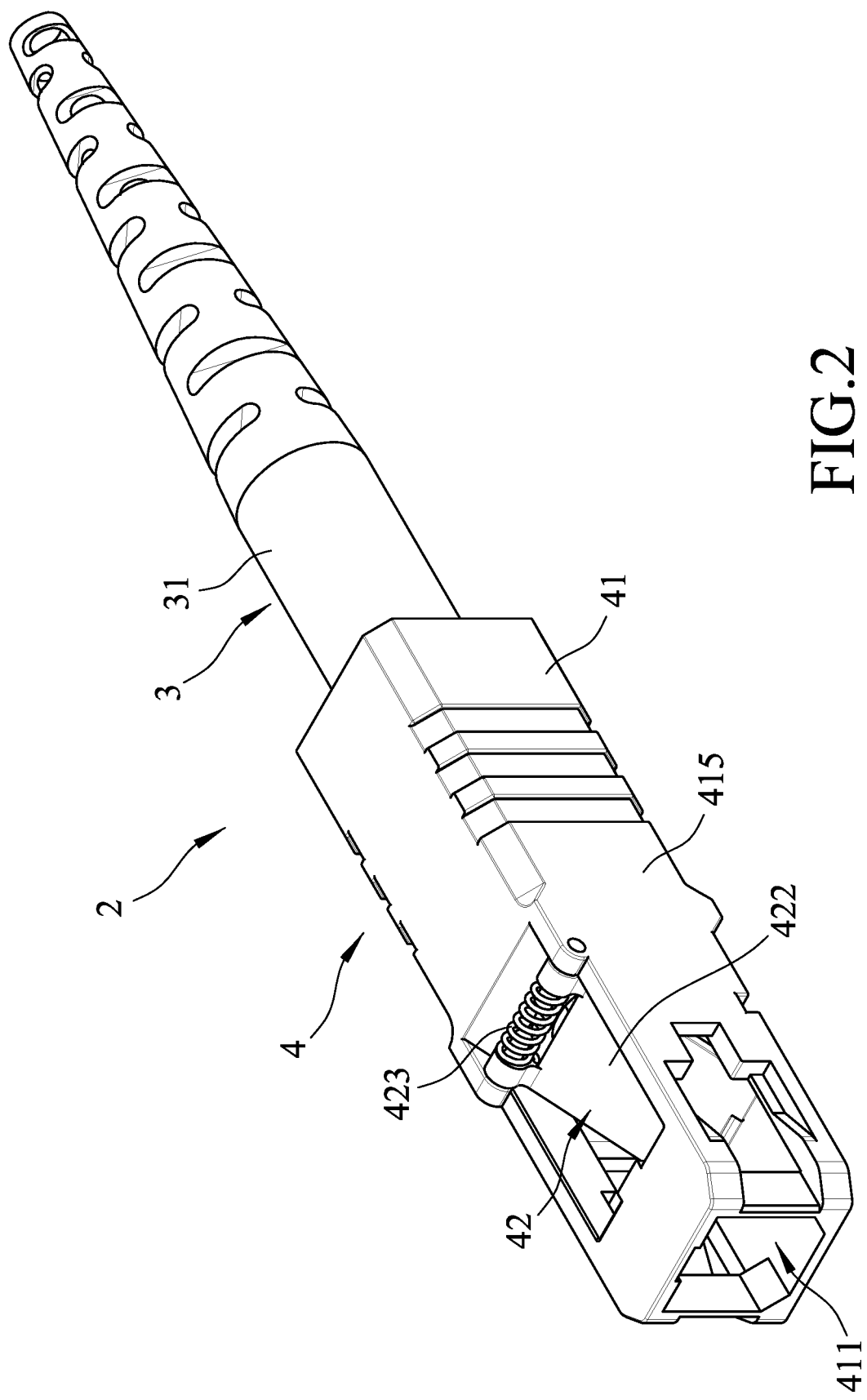
FIG. 2 is a perspective view illustrating an embodiment of an optical fiber connector according to this disclosure.
Figure 3:
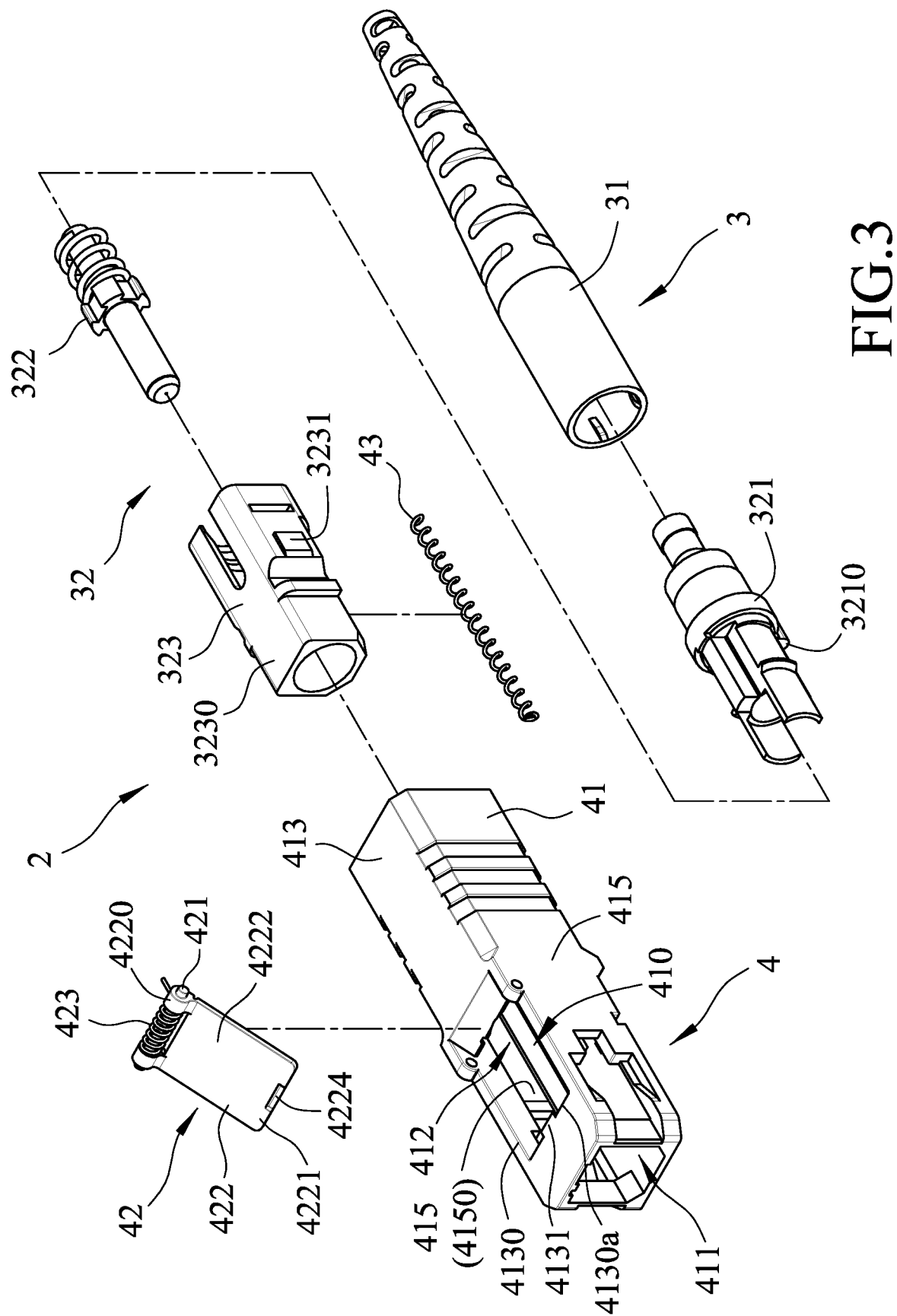
FIG. 3 is an exploded perspective view of the optical fiber connector.
Figure 4:
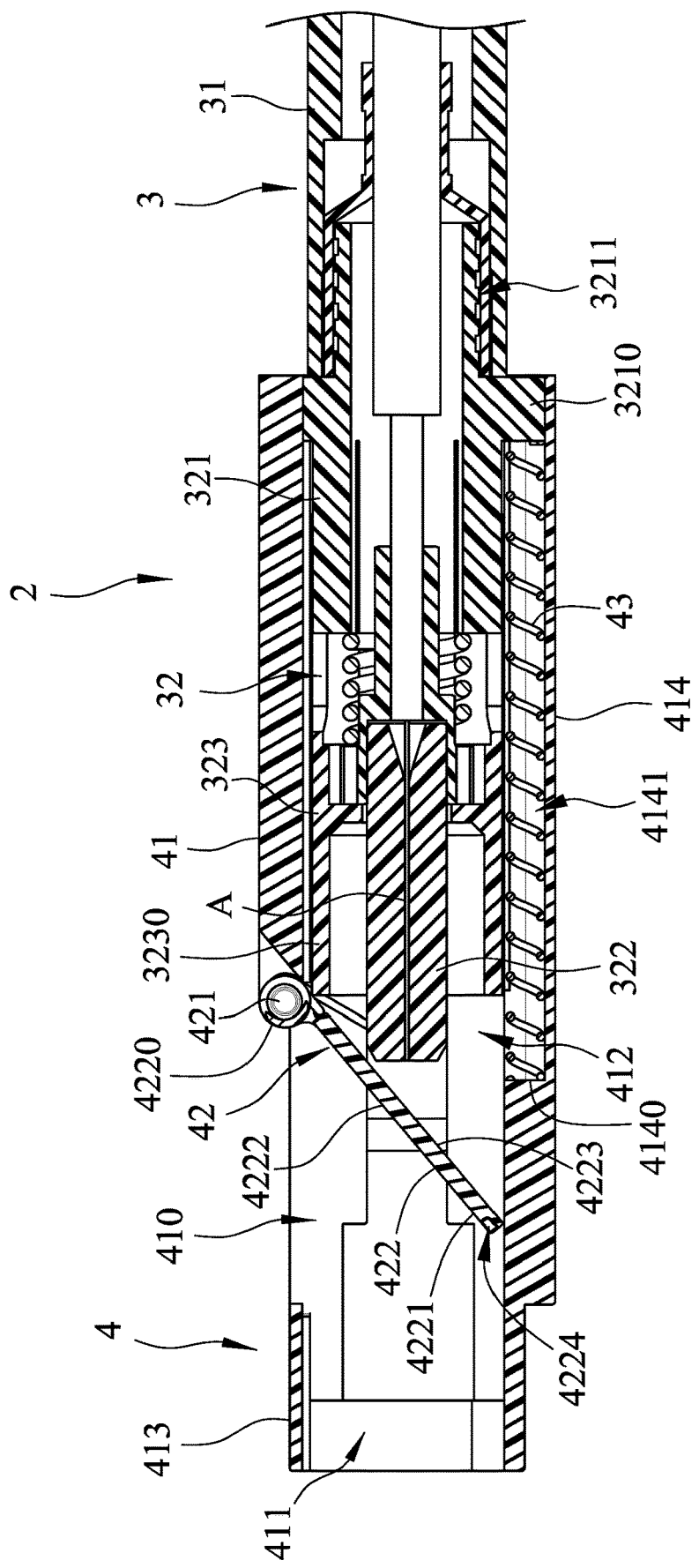
FIG. 4 is a fragmentary sectional side view of the optical fiber connector at a light blocking position.

FIGS. 2 to 4 illustrate an embodiment of an optical fiber connector 2 according to the disclosure. The optical fiber connector 2 includes a main unit 3 and a housing unit 4.

Figure 5:
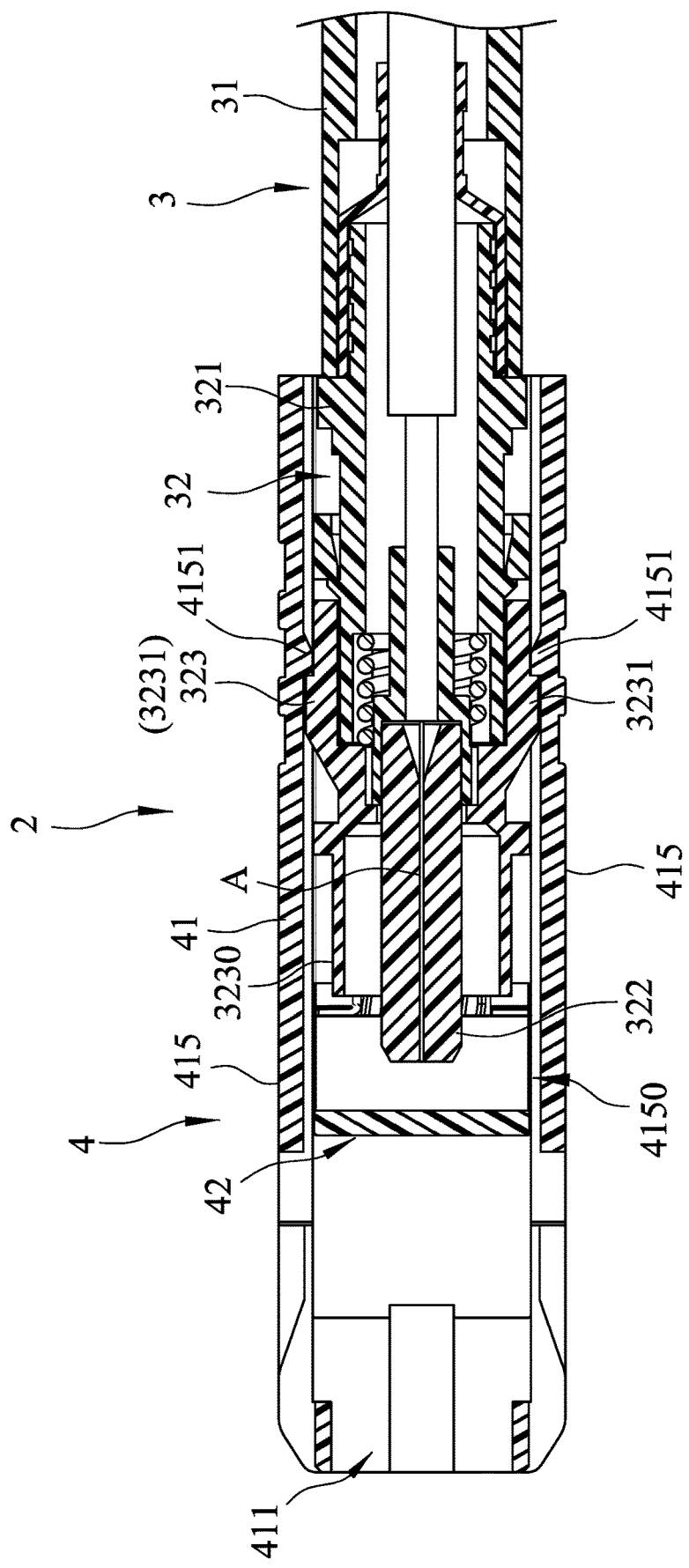
FIG. 5 is a fragmentary sectional top view of the optical fiber connector.

The main unit 3 includes a boot 31 and a connector module 32 that has a rear part connected to a front end of the boot 31, and a front coupling end 3230 distal from the boot 31. An optical fiber cable (A) is inserted into the boot 31 and the connector module 32. Referring to FIG. 5, in combination with FIGS. 3 and 4, The connector module 32 includes an interior sleeve 321 connected to the boot 31, a ferrule assembly 322 inserted into a front part of the interior sleeve 321, and a ferrule casing 323 that is sleeved around the ferrule assembly 322 and the inner sleeve 321.

The housing unit 4 includes a sliding sleeve 41 sleeved slidably around the connector module 32, a light blocking member 42 pivotally connected to the sliding sleeve 41, and a resilient member 43 that is disposed in the sliding sleeve 41.

The sliding sleeve 41 has a frontmost end defining a front opening 411, a passageway 412 that is disposed inside the sliding sleeve 41 rearwardly of the front opening 411 and that is releasably blocked by the light blocking member 42, and a top hole 410 disposed above the passageway 412. Specifically, the sliding sleeve 41 further has opposite top and bottom walls 413, 414, and opposite left and right sidewalls 415 interconnecting the top and bottom walls 413, 414. Each of the front opening 411 and the passageway 412 is formed between the top and bottom walls 413, 414 and between the left and right sidewalls 415. The top hole 410 extends through the top wall 413. The top wall 413 has a boundary edge 4130 that surrounds the top hole 410 and that has a front edge portion 4130a proximal to the front opening 411, and a protrusion 4131 projecting rearwardly into the top hole 410 from the front edge portion 4130a. The bottom wall 414 has an inner surface formed with a longitudinal groove 4141 extending in a front-rear direction of the connector module 32, and a front groove boundary wall 4140 formed at the front of the longitudinal groove 4141. The left and right side walls 415 include inner surfaces each of which has a longitudinal recess 4150 extending along the front-rear direction, and an engagement protrusion 4151 formed in the longitudinal recess 4150 between front and rear ends of the longitudinal recess 4150. In this embodiment, the ferrule casing 323 is sleeved into the sliding sleeve 41 such that the sliding sleeve 41 is sleeved around and slidably engaged with the ferrule casing 323. The ferrule casing 323 includes the front coupling end 3230, and two stop protrusions 3231 distal from the front coupling end 3230 and respectively protruding toward the left and right side walls 415. The stop protrusions 3231 are respectively and slidably inserted into the recesses 4150 and respectively abut front sides of the engagement protrusions 4151 to stop sliding rearward. The inner sleeve 321 has a rear part 3211 exposed from the ferrule casing 323, and an abutment portion 3210 extending from the rear part 3211 into the longitudinal groove 4141 of the bottom wall 414.

The light blocking member 42 includes a pivot shaft 421, a light blocking plate 422 and a torsion spring 423. The pivot shaft 421 extends in a left-right direction transverse to the front-rear direction of the connector module 32 and is mounted to the sliding sleeve 41 above the passageway 412. The light blocking plate 422 has a pivoted end 4220 pivotally connected to the pivot shaft 421 and a free end 4221 opposite to the pivoted end 4220. The torsion spring 423 is sleeved on the pivot shaft 421 and has two opposite ends respectively fixed to the pivot shaft 421 and the light blocking plate 422 to urge the light blocking plate 422.

The light blocking plate 422 is movable between a first position, where the light blocking plate 422 blocks the passageway 412 and the free end 4221 is at the bottom of the passageway 412, and a second position, where the light blocking plate 422 together with the free end 4220 is above the passage way 412 and is received in the top hole 410. The light blocking plate 422 further has opposite first and second surfaces 4222, 4223, and a recess 4224 indented from the first surface 4222 and formed in the free end 4221. The second surface 4223 is flush with the inner surface of the top wall 413, and the protrusion 4131 of the top wall 413 engages the recess 4224 and stops the free end 4221 from moving further upward when the free end 4221 is received in the top hole 410.

The resilient member 43 is received in the longitudinal groove 4141 of the bottom wall 414 and has front and rear ends respectively abutting the front groove boundary wall 4140 of the bottom wall 414 and the abutment portion 3210 of the inner sleeve 321.

Figure 6:
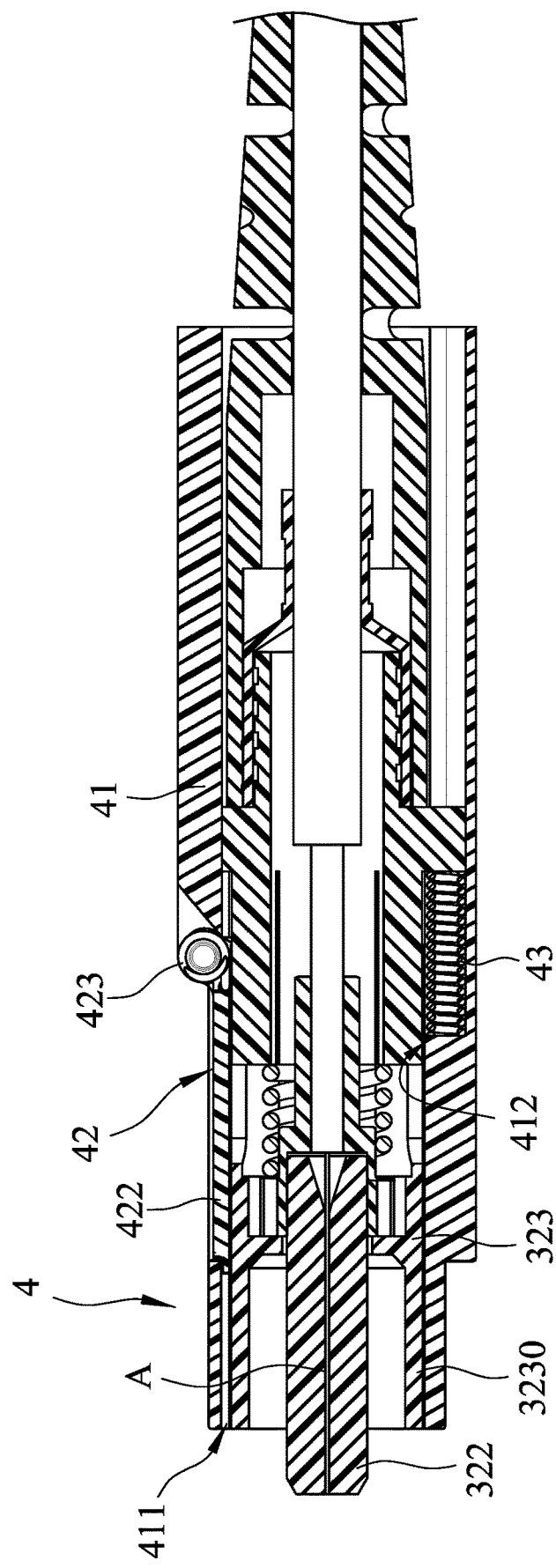
FIG. 6 is a view similar to FIG. 4, but illustrating the optical fiber connector at a fiber coupling position.

As shown in FIGS. 4 to 6, the sliding sleeve 41 is operable to slide in the front-rear direction of the connector module 32 and is movable between a light blocking position where the light blocking member 42 is in front of and blocks light from the front coupling end 3230, and a fiber coupling position, where the light blocking member 42 rotates relative to the sliding sleeve 41 in an opening direction and allows the front coupling end 3230 to be exposed from the sliding sleeve 41. The optical fiber connector 2 is at the light blocking position when no external force is applied to the optical fiber connector 2 and when the optical fiber connector 2 is not optically connected to other optical fiber terminal device. The light blocking plate 422 is inclined with the bottom wall 414 and the free end 4221 of the light blocking plate 422 abuts against the bottom wall 414 so that the light blocking member 42 provides blockage in front of the passageway 412 and the front coupling end 3230 of the connector module 32.

When the sliding sleeve 41 is moved from the light blocking position to the fiber coupling position, the front coupling end 3230 together with the ferrule assembly 322 pushes the light blocking plate 422 to rotate and passes through the passageway 412 to be exposed from the front opening 411, the torsion spring 423 is stressed and restores energy to return the light blocking plate 422, and the resilient member 43 is compressed in the front-rear direction and has a restoring force to restore the sliding sleeve 41 to the light blocking position. At this state, the front part of the ferrule assembly 322 is exposed from the front opening 411, and the optical fiber connector 2 is allowed to make an optical connection with other optical fiber terminal device (not shown). After the optical fiber connector 2 is optically connected to the other optical fiber terminal device, because the front part of the ferrule assembly 322 typically has interlocking means interlockable with other optical fiber terminal device connected thereto, the connector module 32 is prevented from being returned rearward by the action of the resilient member 43 after an external force to compress the resilient member 43 is removed.

When the optical fiber connector 2 is not in use or is not connected to other optical fiber terminal device, the light blocking member 42 functions to block invisible light carried by the optical fiber cable (A) inserted in the ferrule assembly 322, thereby preventing the invisible light from accidentally hurting an operator's eyes and protecting the operator from harmful invisible light. When the optical fiber connector 2 is to be connected to other optical fiber terminal device, the front coupling end 3230 of the connector module 32 may be exposed for making optical connection by simply operating the sliding sleeve 41 without using any additional tool.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector comprising:
    a main unit including a boot and a connector module that has a rear part connected to a front end of said boot, and a front coupling end distal from said boot; and
    a housing unit including a sliding sleeve sleeved slidably around said connector module, and a light blocking member pivotally connected to said sliding sleeve;
    wherein said sliding sleeve is operable to slide in a front-rear direction of said connector module and is movable between a light blocking position, where said light blocking member is in front of and blocks light from said front coupling end, and a fiber coupling position, where said light blocking member rotates in an opening direction relative to said sliding sleeve and allows said front coupling end to be exposed from said sliding sleeve;
    wherein said light blocking member includes a pivot shaft extending in a left-right direction transverse to the front-rear direction of said connector module and mounted to said sliding sleeve, a light blocking plate pivotally connected to said pivot shaft, and a torsion spring sleeved on said pivot shaft;
    wherein when said sliding sleeve is at the light blocking position, said light blocking plate provides blockage in front of said front coupling end of said connector module and is inclined forwardly away from said front coupling end;
    wherein when said sliding sleeve is moved to the fiber coupling position, said connector module pushes said light blocking plate to rotate and causes said front coupling end to protrude from said sliding sleeve, and said torsion spring is stressed and restores energy to return said light blocking plate;

wherein said housing unit further includes a resilient member that is disposed in said sliding sleeve and that has two opposite ends respectively abutting said sliding sleeve and said connector module;

wherein, when said sliding sleeve is moved from the light blocking, position to the fiber coupling position, said resilient member is compressed in the front-rear direction and has a restoring force to restore said sliding sleeve to the light blocking position.

2. The optical fiber connector as claimed in claim 1, wherein said connector module includes an interior sleeve connected to said boot, a ferrule assembly inserted into a front part of said interior sleeve, and a ferrule casing that is sleeved around said ferrule assembly and said interior sleeve and that is sleeved into said sliding sleeve, said sliding sleeve being sleeved around and slidably engaged with said ferrule casing.

3. The optical fiber connector as claimed in claim 2, wherein:

said interior sleeve includes a rear part that is exposed from said ferrule casing; and said resilient member has a front end abutting said sliding sleeve and a rear end abutting against said interior sleeve.

4. The optical fiber connector as claimed in claim 1, wherein:

said sliding sleeve has a frontmost end defining a front opening, and a passageway that is disposed inside said sliding sleeve rearwardly of said front opening and that is releasably blocked by said light blocking member;

when said sliding sleeve is at the light blocking position, said light blocking member provides blockage in front of said passageway; and when said sliding sleeve is moved to the fiber coupling position, said front coupling end of said connector module pushes said light blocking member and passes through said passageway to be exposed from said front opening.

5. The optical fiber connector as claimed in claim 4, wherein:

said light blocking member includes a pivot shaft extending in a left-right direction transverse to the front-rear direction of said connector module and mounted to said sliding sleeve above said passageway, a light blocking plate having a pivoted end pivotally connected to said pivot shaft and a free end opposite to said pivoted end, and a torsion spring sleeved on said pivot shaft to urge said light blocking plate;

said sliding sleeve further has a top hole that is disposed above said passageway; and said light blocking plate is movable between a first position, where said light blocking plate blocks said passageway and said free end is at the bottom of said passageway, and a second position, where said light blocking plate together with said free end is above said passage way and is received in said top hole.

6. The optical fiber connector as claimed in claim 5, wherein said sliding sleeve further has opposite top and bottom walls, and opposite left and right sidewalls interconnecting said top and bottom walls, each of said front opening and said passageway being formed between said top and bottom walls and between said left and right sidewalls, said top hole extending through said top wall.

7. The optical fiber connector as claimed in claim 6, wherein said light blocking plate is inclined with said bottom wall and said free end abuts against said bottom wall when said sliding sleeve is at the light blocking position.

8. The optical fiber connector as claimed in claim 6, wherein:

said bottom wall has an inner surface formed with a longitudinal groove extending in the front-rear direction;

said connector module includes an interior sleeve connected to said boot, a ferrule assembly inserted into a front part of said interior sleeve, and a ferrule casing that is sleeved around said ferrule assembly and said interior sleeve and that is sleeved into said sliding sleeve, said interior sleeve having a rear part exposed from said ferrule casing, and an abutment portion extending from said rear part into said longitudinal groove of said bottom wall, said ferrule casing including said front coupling end, and two stop protrusions distal from said front coupling end and respectively protruding toward said left and right side walls;

said left and right side walls including inner surfaces each of which has a longitudinal recess extending along the front-rear direction, and an engagement protrusion formed in said longitudinal recess between front and rear ends of said longitudinal recess, said stop protrusions being respectively and slidably inserted into said recesses and respectively abutting front sides of said engagement protrusions to stop sliding rearward;

said bottom wall further includes has a front groove boundary wall formed at the front of said longitudinal groove; and said housing unit further includes a resilient member that is received in said longitudinal groove and that has front and rear ends respectively abutting said front groove boundary wall of said bottom wall and said abutment portion.

\* \* \* \* \*